Patented Nov. 7, 1950

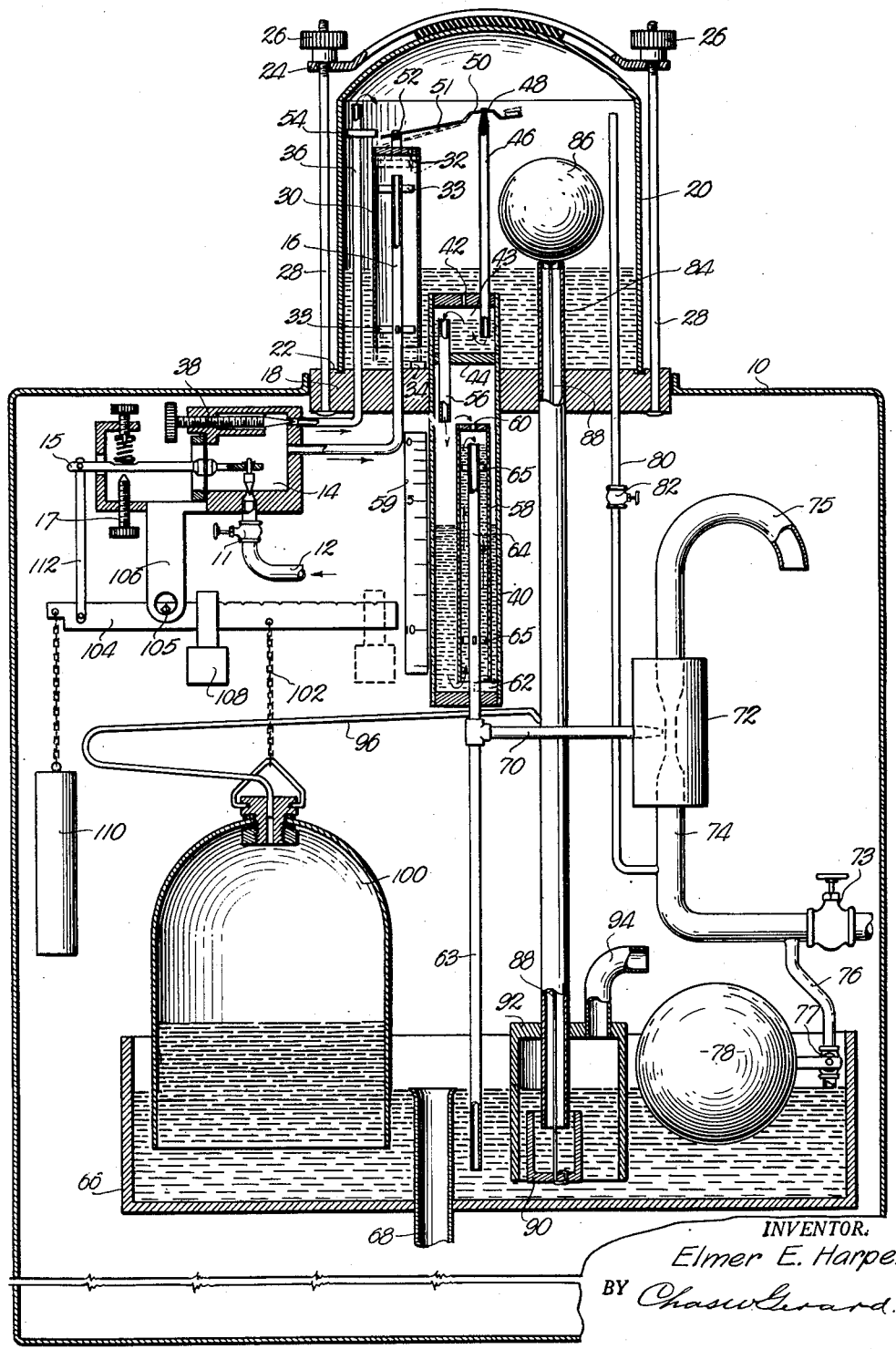

2,529,251

UNITED STATES PATENT OFFICE 2,529,251

VOLUMETRIC GAS FEEDING APPARATUS

Elmer E. Harper, Monrovia, Calif.; Esther Pardee Harper, executrix of Elmer E. Harper, deceased Application January 8, 1945, Serial No. 571,878

4 Claims. (Cl. 210—28)

This invention relates to apparatus for feeding or dispensing chemicals, such as chlorine gas, ammonia gas, etc., with particular reference to the feeding of such materials by volume, as, for example, in the feeding of chlorine gas for the chlorination of water in commercial water purification systems.

Accordingly, it is a special object of the invention to devise new and improved apparatus of this character which will operate with superior efficiency and accuracy as compared with the types of equipment now in common use, and which will also be distinguished by marked advantages as regards both the capacity range and the sensitiveness of the control of the feeding rate of the apparatus.

For the accomplishment of these purposes I have devised equipment using a minimum of the usual liquid type of float-actuated control means, and in lieu thereof employ control devices of a more accurate and sensitive nature, such as improved and more delicate valve mechanism in combination with gas pressure responsive means and so arranged as to form a highly sensitive control system whereby the operation is rendered most flexible as regards its capacity and also the ease and accuracy of the control of the rate of gas outflow from the apparatus.

As one form of construction for the embodiment of my improvements, I provide apparatus in which a differential pressure zone is maintained in the path of the gas flow, together with control means which is responsive to fluctuations in said pressure for producing an appropriate regulation of the flow rate. In practice, the improved apparatus will provide regulating means for regulating the flow of gas both into and out of the control or regulating chamber, together with control means responsive to pressure variations, whereby a corresponding control action will be imparted simultaneously to the regulating means at the intake as well as the outlet from the regulating chamber.

With the foregoing general objects in view the characteristics of the invention will now be described in more detail by reference to one form or example of a construction suitable for the embodiment of my proposed improvements, after which those features and combinations deemed to be novel and patentable will be particularly set forth and claimed.

In the drawing, the view shown is a schematic elevation illustrating a form of chemical feeding apparatus suitable for the practice of the present invention, the gas inlet and outlet connections being illustrated as broken away within the cabinet forming a part of the apparatus.

Most of the prevailing types of gas feeding apparatus, to which the present invention relates, operate to feed chlorine and the like, in gaseous form and by volumetric control, through the medium of some form of orifice device through which the gas is caused to flow at a rate which is a function of the size of the orifice opening and of the differential pressure which produces that flow—assuming that the temperature of the incoming gas at the orifice remains substantially constant. Some of these commercial types of equipment use a needle valve for the control orifice, others use pressure regulating valves for controlling the rate of gas flow, while another type makes use of differential pressure means regulated in turn by means dependent on liquid float control connections, or diaphragm-actuated devices of one form or another.

These various forms of commercial equipment are subject to well-known operative defects, such as the sluggish action of floats of the liquid-actuated type, the stiff and fragile nature of diaphragm devices (which are necessarily restricted as to kind and weight of material used), and the low degree of precision control necessarily resulting from sluggish liquid float action and the operation of the complicated mechanical connections required for the relatively numerous float devices entering into the average equipment; in addition to which, such equipment is also quite cumbersome in its space requirements, due to the relatively large number of floats and liquid compartments needed, thereby limiting its range as to pressure differential. This in turn imposes corresponding restrictions as to any accurate feeding range or capacity for such equipment, in connection with any given size of orifice used for control of the gas flow.

The present improved apparatus aims to avoid for the most part, the various objections above outlined, by eliminating the use of equipment the operation of which is dependent on liquid float action, and substituting improved means in which the principle of the control is primarily dependent upon differential pressure action in the gas flow as developed by the feeding operation, and variations occurring in such differential pressure are in turn utilized for automatically maintaining a substantially uniform gas flow.

Referring now to the drawing in detail, this illustrates the apparatus as comprising a construction which may be housed for the most part within a cabinet 10. Accordingly, a gas supply tube 12 leads from the container (not shown) of the chlorine or other gas supply, to a control valve which is designated generally by reference numeral 14. This valve may be of any suitable construction for the purpose, and one outlet from the valve being by way of a flow tube 16 which projects upwardly through a block or plate 18 at the top of the cabinet 10. This block 18 forms the supporting base for a glass bell jar 20, the lower edge of which is seated with a gas-tight fit in a groove 22 in said base, and firmly secured in this position by means of a tie-bar 24, engaging the top of the jar, where the ends of the bar are engaged by nuts 26 at the upper ends of anchor rods 28 which have their lower ends held in retaining engagement with said base block 18.

Enclosing the upper end portion of the tube 16 is an orifice bell member 30 formed with a gas orifice 32 at its upper end, the tube 16 having guide elements 33 adapted to function as guiding means for said bell member in its vertical movements, as hereinafter explained. The bell member 30 rests initially on a spacer block 34 in such a manner as to maintain its lower end in liquid communication with the interior of the bell jar 20.

A bypass gas supply tube 36 may also be provided, leading from the valve 14 through the base block 18 to the upper interior of the bell jar 20; and the inlet end of this bypass tube 36 may be suitably controlled by a secondary valve 38.

Mounted in projecting relation both above and below the block or plate 18 is a transparent tube 40 closed at both ends with the exception of a water leak orifice 42 at its upper end which is adapted to feed water to a bubble compartment 43 formed above a partition block 44 in the upper end portion of said tube 40, at approximately the level of the bottom of the bell jar 20. A gas flow tube 46 is mounted in the upper end of the tube 40, with its lower end adjacent to the bottom of the compartment 43, while its upper end projects well above the upper end of the tube 16 and terminates in a thin-edged valve seat defining a gas inlet orifice 48 which is controlled by a rocker type of valve member 50 in all respects similar to that illustrated in my copending application Serial No. 539,049, filed June 7, 1944, now Patent No. 2,459,700 dated January 18, 1949. This valve is shown as provided with an operating arm 51 projecting over the orifice bell member 30, the upper end of which carries an angular projection or loop element 52 adapted for actuating engagement with said arm 51; and moreover, a stop element 54 is shown as adjustably mounted upon the upper end portion of the bypass tube 36 in position for engaging and limiting the upward movement of said bell member.

A tube 56 is also shown as providing a medium for the gas flow from the upper portion of the bubble compartment 43 to the space within the tube 40 below the partition 44, where a flow-metering manometer structure is provided in the lower portion of said tube 40.

This structure comprises a gas manometer tube 58 having a metering orifice 60 in its upper end, and having its lower open end supported in liquid-communicating relation with the interior of the tube 40, as by means of a supporting spacer block 62 located in the lower end of said tube 40. The manometer tube encloses the upper portion of a combination gas and water outlet tube 64 which leads out through the bottom of the tube 40 and carries spacer elements or spiders 65 serving as positioning means for the tube 58, that is, for maintaining said tube 58 in proper vertical position as well as in spaced relation to the tube 64.

The outlet pipe 64 extends down to a point adjacent to the bottom of a constant level float box 66 which is provided with an overflow pipe 68. Below the tube 40 the pipe 64 is connected by a pipe 70 with a water-jet form of eductor device 72 having a water supply connection 74 and also a discharge outlet 75 for the outgoing gas and water mixture. The water supply pipe is provided with a branch connection 76 controlled by a valve 77 and float 78 for supplying water to the box 66, and also a branch pipe 80 communicating with the upper interior of the bell jar 20 and provided with a regulating valve 82, as shown. In this connection it may be stated that one purpose of using the said eductor device is to develop a partial vacuum or negative pressure condition in the carrying out of the control operation, as a safeguard against any leak in the system, which would result only in drawing in air to be mixed with the chlorine gas; that is to say, any leak in the system would be inward rather than outward. While this might involve a reduction in the feeding rate of the gas, pending repair of the leak, it would be preferable to an objectionable escape of the chlorine which might result from a reliance on a feeding pressure as maintained at the source of said gas supply.

Extending through the base 18 of the bell jar 20 is a combination vent and overflow pipe 84 projecting some distance above the upper end of the tube 40, while the lower end of the pipe 84 extends below the normal water level in the float box 66. A safety float ball 86 is mounted on the upper end of the pipe 84 and provided with a connecting wire 88 or the like supporting a vacuum breaker cup 90 which encloses the lower end of the pipe 84; and this pipe 84 also carries a vent bell 92 which in turn encloses said cup 90 and is provided with a safety vent outlet 94.

From the combination vent and overflow pipe 84 a flexible tubular conection 96 leads to the top of a bell float member 100, the lower portion of which is submerged below the liquid level in the float box 66. The top of this float member 100 is also provided with an operating connection 102 with one arm of a beam 104 which is fulcrumed at 105 upon a fixed supporting arm 106 beneath the valve device 14. This arm of the beam 104 is also provided with an adjustable poise 108 and the other arm of the beam carries a counterbalancing weight 110 and is provided with a link connection 112 with the control arm 15 of the valve 14.

In the operation of the apparatus, water is admitted to the float box, and to the bell jar 20, up to the levels indicated in the drawing, whereupon the supply of gas is admitted to the valve 14 (by opening of the valve 11 of the gas supply tube 12); and with the valve 73 in the water line 74 also open, the operation of the water-jet eductor device 72 will result in a vacuum action being produced through the connections to the rocker valve 50, and hence to the interior of the bell jar 20. The degree of vacuum thus produced in the bell jar will depend upon the relative extent of opening of the valves 14 and 50.

Preliminary manual adjustment and setting of the gas inlet valve 14 predetermines the limit of the working vacuum to be maintained in the bell jar 20; for as the vacuum action in the jar 20 approaches such predetermined limit, a differential pressure is developed (as indicated by the irregular water level) due to the gas entering the jar 20 by way of the orifice 32 of the orifice bell, as a consequence of which said orifice bell 30 will rise and thereby allow the control valve 50 to move into more nearly closed position. The bell member 30 in its lowermost position operates to maintain said valve 50 open, and the vertical movement of the bell member may be sufficient to entirely close said valve, following which a further rise of the bell member causes it to engage the stop 54, thereby limiting its vertical upward movement.

As the operation proceeds, this actuation of the control valve 50 in response to fluctuations of the differential pressure in the bell jar or regulating chamber 20 will take place automatically, thereby tending to maintain a constant degree of vacuum within said chamber. This substantially constant vacuum action is in turn utilized for correspondingly controlling the gas inlet valve 14, by virtue of the pipe connection 84 and branch tube 96 through which said vacuum action is transmitted to the bell float chamber 100. Consequently the movements of the float member 100 will be in unison with those of the orifice bell 30, and so coordinated as to operate the valve 14 in a manner which will regulate the gas inflow and, in turn, the operation of the valve 50, so that a steady and uniform vacuum will be maintained in the bell jar or regulating chamber 20.

In this connection it may be stated that the bypass tube 36 is provided for accommodating a supplemental flow of gas as required, inasmuch as it is not at all essential that the entire flow of gas take place through the pipe 16, and the orifice 32 being purposely of relatively small diameter for accommodating small rates of gas flow, and the responsive movements of the orifice bell member being the same regardless of the extent of gas flow bypassed through the pipe 36.

The gas leaving the bell jar 20 flows through the orifice 48 and tube 46 into the bubble compartment 43, where the slightest gas current is indicated by the bubbling action produced as it passes through said compartment and on through the tube 56 and into the manometer tube 58. Here the water is separated from the gas and follows the path indicated by the arrows while the gas flows through the metering orifice 60 and thereafter rejoins the water, the water and gas mixture flowing on through the tube 64 and the connection 70 to the eductor device 72, and thence through the discharge outlet 75.

Since the normal flow of gas and water from the tube 64 is not sufficient to satisfy the vacuum capacity of the eductor device 72, a supplementary water supply is drawn up from the float box 66 through the lower extension of the pipe 64, with a view to maintaining a substantially constant and approximately fixed vacuum in the gas outlet tube 46.

Alongside the tube 40, opposite the manometer tube 58, is arranged a suitable flow rate scale 59, appropriately calibrated to indicate rates of gas flow, with zero reading opposite the top of said tube 58, and so long as there is no gas flow taking place through the pipe 46, the surface of the water level in the tube 40 will also register opposite said zero reading. But when a gas flow has been established through the tubes 46 and 58, a differential pressure will be produced operating to lower the water level in the tube 40 outside the tube 58, which will thus provide an accurate indication of the gas flow taking place through the orifice 60 of the manometer tube 58.

From this explanation of the general operation it will be clear that the principal objects of the invention are accomplished, in that the orifice bell member 30 in combination with the control valve 50 provide a most sensitive means, operating in response to the most minute changes in differential pressure, for effectively controlling the gas flow; and since the response of the orifice bell is instantaneous and non-pulsating and also positive in action, this insures a high degree of uniformity, steadiness and accuracy with which the vacuum action is maintained for the production of the gas flow, and incidentally, an operation suitable for manometer readings as above referred to. Moreover, as a further control function, which may be either supplemental or adapted to be carried out entirely independent of the first control action, for the regulation of the valve 14 itself, this likewise is rendered directly responsive to any variation of the vacuum condition within the bell jar 20 and operates to effect proper adjustment of said valve 14 for making just such corrections of the feeding rate as are indicated by the fluctuations responded to, as already explained.

The arrangement of the bubble device in the manner shown and combining it with the construction provided for the metering manometer has important advantages. The bubble compartment provides an efficient visible indicator, operating to indicate the slightest gas flow, and being visible at a distance upwards of fifty feet when suitably illuminated. The water supply necessary for both the bubble compartment and the manometer structure is conveniently drawn from the bell jar 20 and this supply automatically maintained constant by the novel design of construction illustrated.

Provision is made for safeguarding the foregoing operation against abnormal pressure conditions. For example, while the operation of the eductor device is not adapted to produce an excessive vacuum in the bell jar or chamber 20, an excessive suctional action from the gas supply line 12 might be sufficient to pull water into the jar through the pipe 84 but for provision of the connection from the float 86 to the vent cup 90 whereby any such excess vacuum would be at once broken. Likewise, any excess of positive gas pressure in said bell jar or chamber 20 would be vented out through said tube 84 to the vent bell 92 and outlet 94. Obviously the possibility of any excess water pressure in said jar or chamber 20 is eliminated by the provision of the large overflow outlet 84.

It will be apparent, as already indicated, that the control features of the invention may be practised either concurrently or independently of each other. For example, the automatic regulation of the valve 14 through the medium of the bell float member 100 might be dispensed with; or the control by means of the orifice bell 30 and control valve 50 and their related parts might under some conditions be omitted, leaving the control function dependent upon the operation of the float member 100 and its connections.

As has already been indicated, any required volume of gas, in excess of the capacity of the orifice 32, can be admitted through the bypass pipe 36 controlled by the valve 38. Moreover, the adjustable poise 108 provides means for adjusting and setting the rate of gas flow, particularly when operating on a relatively low differential pressure and all the flow is through said orifice 32 of the orifice bell member 30, leaving said bypass valve 36 closed.

Again, it is obvious that the operation might, if necessary or desired, be carried out entirely manually, as by means of a regulating screw 17 operating against the control arm 15 of the valve 14.

Finally, it may be further pointed out that even in the absence of or failure of other means of control, the apparatus as herein illustrated, having the inlet valve 14 as one means of control, may be operated without appreciable interruption or necessity of a shut-down, simply by temporary regulation through the medium of said inlet valve.

While I have herein shown and described apparatus made up of the necessary parts in appropriate operative relationship for the practice of my invention, it is to be understood that the relationship so indicated is merely illustrative and that the same may be greatly varied and modified to conform to varying requirements of local conditions. The parts of the regulating valve 14, for example, may preferably be elevated above the cabinet 10 for greater accessibility; and, for chlorine operation a more special type of valve would doubtless be preferable, such as the torsion and packless type illustrated in my Patent No. 2,293,647 dated August 18, 1942. I therefore desire to be understood as expressly reserving the right to make all such formal changes as may fairly fall within the spirit and scope of my invention as defined by the appended claims.

Having thus described my invention, what I claim and desire to secure by Letters Patent is:

1. Apparatus for the feeding of gases at a substantially uniform rate, comprising a regulating chamber having a gas intake and a gas outlet, vacuum producing means communicating with said gas outlet, means for regulating the flow through said gas intake and said gas outlet respectively, and a combination visible flow indicating and metering structure included in the discharge flow line from said gas outlet and subject to the vacuum effect of said vacuum producing means, said structure comprising a transparent-walled water chamber divided by a partition into a lower manometer compartment and an upper gas bubbling compartment communicating directly with said gas outlet, and a tube carried by said partition and providing an overflow connection between said lower compartment and the upper portion of said gas bubbling compartment.

2. Apparatus for the feeding of gases at a substantially uniform rate, comprising a regulating chamber having a gas intake and a gas outlet, vacuum producing means communicating with said gas outlet, means for regulating the flow through said gas intake and said gas outlet respectively, and a visible-flow indicating and metering structure included in the discharge flow line from said gas flow outlet and comprising a gas bubbling compartment overflowing into a manometer structure subject to the vacuum effect of said vacuum producing means.

3. Apparatus for the feeding of gases at a substantially uniform rate, comprising a regulating chamber having a gas intake and a gas outlet and having a liquid level therein below said intake and outlet, vacuum producing means communicating with said chamber above said liquid level, means for regulating the flow through said intake whereby a differential pressure may be developed in said chamber, float-actuated means responsive to fluctuations in said differential pressure for controlling the flow through said gas outlet, and a combination visible flow indicating and metering structure included in the discharge flow line from said gas outlet, said structure comprising a transparent walled water chamber divided into a lower manometer compartment subject to the vacuum effect of said vacuum producing means, and an upper gas bubbling compartment communicating directly with said gas outlet and also having an overflow connection with said manometer compartment.

4. Apparatus for the feeding of gases at a substantially uniform rate, comprising a regulating chamber having a gas intake and a gas outlet and having a liquid level therein below said intake and outlet, vacuum producing means communicating with said chamber above said liquid level, float-actuated means for controlling the flow through said gas outlet in response to differential pressure variations in said chamber, and a visible-flow indicating and metering structure included in the discharge flow line from said gas outlet and comprising a gas bubbling compartment in liquid communication with said chamber and overflowing into a manometer structure subject to the vacuum action of said vacuum producing means.

ELMER E. HARPER.

REFERENCES CITED

The following references are of record in the file of this patent:

UNITED STATES PATENTS

| Number | Name | Date |
|---|---|---|
| 1,514,939 | Wallace | Nov. 11, 1924 |
| 2,086,957 | Peet | July 12, 1937 |
| 2,096,021 | Aherne | Oct. 19, 1937 |
| 2,137,204 | Booth | Nov. 15, 1938 |
| 2,158,976 | Booth | May 16, 1939 |
| 2,158,985 | Booth | May 16, 1939 |
| 2,260,936 | Everson | Oct. 28, 1941 |
| 2,300,642 | Booth | Nov. 3, 1942 |
| 2,401,012 | Ornstein | May 28, 1946 |
| 2,459,700 | Harper | Jan. 18, 1949 |
| 2,469,230 | Harper | May 3, 1949 |